(12) United States Patent
Rajpal et al.

(10) Patent No.: US 8,984,175 B1
(45) Date of Patent: Mar. 17, 2015

(54) METHOD AND APPARATUS FOR PROVIDING REDUNDANT PATHS TO A STORAGE VOLUME

(75) Inventors: Shiv Rajpal, Fremont, CA (US); Ajay P. Salpekar, Fremont, CA (US); Margaret Kwong, Foster City, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1941 days.

(21) Appl. No.: 10/832,150

(22) Filed: Apr. 26, 2004

(51) Int. Cl.
*G06F 3/00* (2006.01)

(52) U.S. Cl.
USPC ............... 710/10; 710/18; 710/19; 719/326; 719/327

(58) Field of Classification Search
USPC .......................................................... 710/10
See application file for complete search history.

(56) References Cited

U.S. PATENT DOCUMENTS

| | | | | |
|---|---|---|---|---|
| 5,333,277 A | * | 7/1994 | Searls | 710/300 |
| 6,480,934 B1 | * | 11/2002 | Hino et al. | 711/114 |
| 6,883,065 B1 | * | 4/2005 | Pittelkow et al. | 711/114 |
| 7,260,737 B1 | * | 8/2007 | Lent et al. | 714/5.11 |
| 2003/0182494 A1 | * | 9/2003 | Rodrigues et al. | 711/100 |
| 2005/0149650 A1 | * | 7/2005 | Workman et al. | 710/38 |

* cited by examiner

*Primary Examiner* — Henry Tsai
*Assistant Examiner* — Dean Phan
(74) *Attorney, Agent, or Firm* — Campbell Stephenson LLP

(57) ABSTRACT

A method and apparatus for providing a multipathing connection to a storage volume, where in one embodiment, the invention prohibits the disk driver from reading the storage parameter information (e.g., table of contents) upon initialization. The method commences with a multipathing disk driver determining at least on active port and at least on passive port for the storage volume. The disk driver then sends a request via the active port to the storage volume for the storage parameter information that is contained in the disk array. After the host computer's operating system disk driver receives the storage parameter information, it copies the information and distributes the information to the port definitions for the passive ports. Consequently, the ports are defined without causing a failover within the storage volume.

14 Claims, 2 Drawing Sheets

METHOD AND APPARATUS FOR PROVIDING REDUNDANT PATHS TO A STORAGE VOLUME

BACKGROUND OF THE INVENTION

1. Field of the Invention

Embodiments of the present invention generally relate to data storage systems and, more particularly, to a method and apparatus for providing a multipathing connection to a storage volume.

2. Description of the Related Art

Modern computer networks generally comprise a plurality of user computers connected to one another and to a computer server via a communications network. To provide redundancy and high availability of information and applications that are executed upon a computer server, multiple computer servers may be arranged in a cluster, i.e., forming a server cluster. Such server clusters are available under the trademark VERITAS CLUSTER SERVER from Veritas Software Corporation of Mountain View, Calif. In a server cluster, a plurality of servers communicate with one another to facilitate failover redundancy such that when software or hardware, i.e., computer resources, become inoperative on one's server, another server can quickly execute the same software that was running on the inoperative server substantially without interruption. As such, a user of services that are supported by a server cluster would not be substantially impacted by an inoperative server or software.

Within a server cluster, the servers are generally connected to at least one switch that controls access to one or more storage volumes. Each switch contains a host computer that facilitates routing of data and READ/WRITE requests to and from the storage volume. The storage volume generally comprises two data ports that are each coupled to a separate storage processor. The storage processors facilitate access to data stored on one or more disk drive arrays within the storage volume. Furthermore, these two storage processors connect one or more disk arrays to the host computer. One storage processor is "active" and is used to transmit data to and from a disk array having a predefined logical unit number (LUN). The other storage processor is designated as "passive" and will serve as a replacement for the active processor in the event the active processor fails (i.e., the two storage processors provide redundancy).

Rapid failover from one storage processor to another is accomplished by designating one port associated with the active storage processor as an active port and designating the other data port associated with the passive storage processor as a passive port. A host (within a switch or elsewhere) uses the active port to READ/WRITE data to the storage volume. If the host detects a problem with reading data from the storage volume, it will automatically resend the READ request to the passive port. Upon receiving a READ request on the passive port, the storage volume assumes a failure of the active storage processor (or a failure of the communication path to the storage volume) has occurred such that the passive storage processor is now designated the active storage processor. As such, a failover from the active port to the passive port is automatically accomplished. The host will, from now on, use the new active storage processor for communications to the storage volume.

In a storage system such as described above, failover may be triggered during the initialization of a host computer's disk driver (i.e., the disk driver that facilitates communications on the active and passive ports). During the disk driver's initialization process, a request in the form of a READ command is sent to both of the storage volume's ports. The disk driver transmits this request for the purpose of obtaining a copy of the table of contents (TOC) information contained in the storage volume. Typically, problems will not arise if the request is sent via the active storage processor. However, if a READ command is issued to the passive storage processor to request the TOC information, failover automatically occurs and the active and passive storage processors are exchanged in the manner described above. Bearing in mind that failover is caused by the initialization of the host computer's disk driver, coupled with the fact that a plurality of host computers could be connected to the same storage volume, there is significant potential for a multitude of compounding failovers, or a "ping-ponging" effect as each host is initialized. As a result, this problem causes performance degradation (i.e., wasted time switching the active and passive storage processors) within the system.

Therefore, there is a need in the art for a method and apparatus for avoiding failovers during the initialization of a host computer's disk driver to provide a robust mulitpathing connection to a storage driver.

SUMMARY OF THE INVENTION

The embodiments of the present invention are generally directed to a method and apparatus for providing a multipathing connection to a storage volume. In one embodiment, the invention controls the operating system (OS) disk driver's access to the storage parameter information (e.g., TOC or other information stored on a disk array) of a storage volume upon initialization. The method commences with the multipathing driver sending one of a possible number of non-disruptive, non-READ/WRITE commands to the storage volume. From the responses to these commands, the multipathing driver is able to identify the active and passive ports of the storage volume. The actual type of command that is transmitted is dependent on and is different for each type of storage volume (e.g., inquiry command, mode sense command, etc.). Non-READ/WRITE commands are able to request storage volume information from the storage processor that is not contained on the disk arrays themselves; thus, a failure will not be invoked. The information returned by the storage volume in response to the non-READ/WRITE commands is used to derive port information. As such, port information for each port in the storage volume is then received and the host computer is subsequently able to determine the specific parameters of the active and passive ports. Once furnished with this data, the host computer sends a request via the active port to the storage volume for the storage parameter information that is contained in the disk array. After the host computer receives the storage parameter information, it copies the information and distributes the information to the port definitions for the passive ports. Consequently, the ports are defined without causing a failover between the storage processors in the storage volume while enabling the port definitions used by the OS disk drivers to be fully defined.

BRIEF DESCRIPTION OF THE DRAWINGS

The following detailed description makes reference to the accompanying drawings which are now briefly described.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF THE INVENTION

Figure 1:
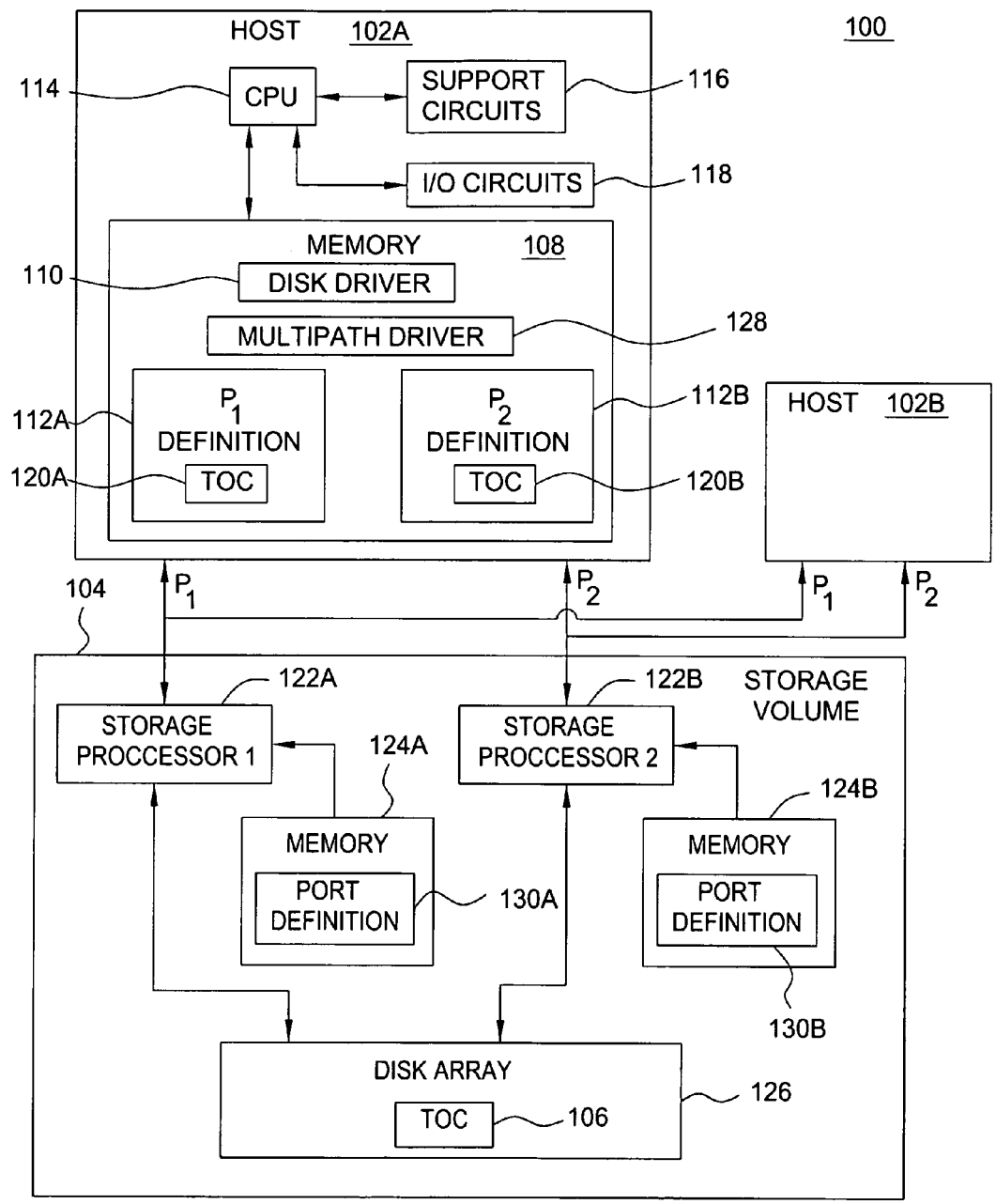
FIG. 1 is a block diagram of a computer network that operates in accordance with the present invention.

FIG. 1 depicts a computer network 100 in which embodiments of the present invention may be utilized. This figure only portrays one variation of a myriad of possible network configurations. For example, FIG. 1 could have depicted numerous host computers as well as including a switch between the hosts and the storage volume. The invention, as shall be discussed below, is a method and apparatus for providing a multipathing connection to a storage volume.

The computer network 100 comprises a plurality of host computers 102A and 102B (collectively referred to as host computers 102) that are connected to a storage volume 104. The host computer 102A may be a component of a network switch or other network traffic control subsystem. If a component of a switch, the host computer 102A facilitates communications between a plurality of servers (not shown) and the storage volume 104. In such an embodiment, each switch would comprise a host computer 102A or 102B. Every host 102 comprises a central processing unit (CPU) 114, support circuits 116, I/O circuits 118, and memory 108. The CPU 114 may comprise one or more conventionally available microprocessors and is coupled to the support circuits 116, I/O circuits 118, and memory 108. The support circuits 116 are well known circuits used to promote functionality of the CPU 114. Such circuits include, but are not limited to, a cache, power supplies, clock circuits, and the like. The I/O circuits 118 are the input/output interface circuitry that is responsible for data transfer between the host 102 and the ports of the storage volume 104. The ports are located at the storage volume 104 and are the endpoints of the channels connecting the host 102 to the storage volume 104. The ports receive the commands originating from the host computer 102.

The storage volume 104 is the section of the computer network 100 where the arrays of disk drives are located. One exemplary disk array 126 is depicted in FIG. 1. Also located within the storage volume 104 are two storage processors 122A and 122B. Each storage processor is connected to the disk array 126 to provide for multiple access ports and connection redundancy. The disk array 126 is defined by a LUN. Both storage processors can access the disk array 126 by addressing the array's LUN. If additional arrays are located in the storage volume, they are generally assigned different LUNs such that each array can be independently accessed by the storage processors. The disk array 126 contains the disk array's TOC information 106. The processors 122A and 122B are coupled to respective memories 124A and 124B. These memories are generally random access memories that store port definitions 130A and 130B for the respective input/output ports, $P_1$ and $P_2$ that are coupled to the processors 122A and 122B. A port definition 130A and 130B comprises an address for the port, the communication format, data format, and packet information used to communicate to the storage volume 104.

The memory 108 contained with the host 102 may comprise random access memory, read only memory, removable disk memory, flash memory, and various combinations of these types of memory. The memory 108 is sometimes referred to as main memory and may, in part, be used as cache memory or buffer memory. In one embodiment, the memory 108 comprises an OS disk driver 110, a multipathing disk driver 128, and a plurality of port definitions 112. The multipathing disk driver 128 can either be a part of the larger OS disk driver 110 or it can be its own separate routine that operates in cooperation with the OS disk driver 110. Regardless of the multipathing disk driver's location, this disk driver 128 is responsible for submitting a request for the storage volume's port definitions. Once the request is received, the multipathing disk driver 128 will obtain information regarding the number of ports as well as the status of each port. The multipathing disk driver 128 will then be able to determine which ports are the active and passive ports of the storage volume 104. After the multipathing disk driver 128 identifies the active and passive ports, it will relay this information to the OS disk driver 110. Lastly, the OS disk driver 110 will then obtain the storage volume's table of contents information 106 from the active port and subsequently populate the passive port definitions with a copy of this information.

Figure 2:
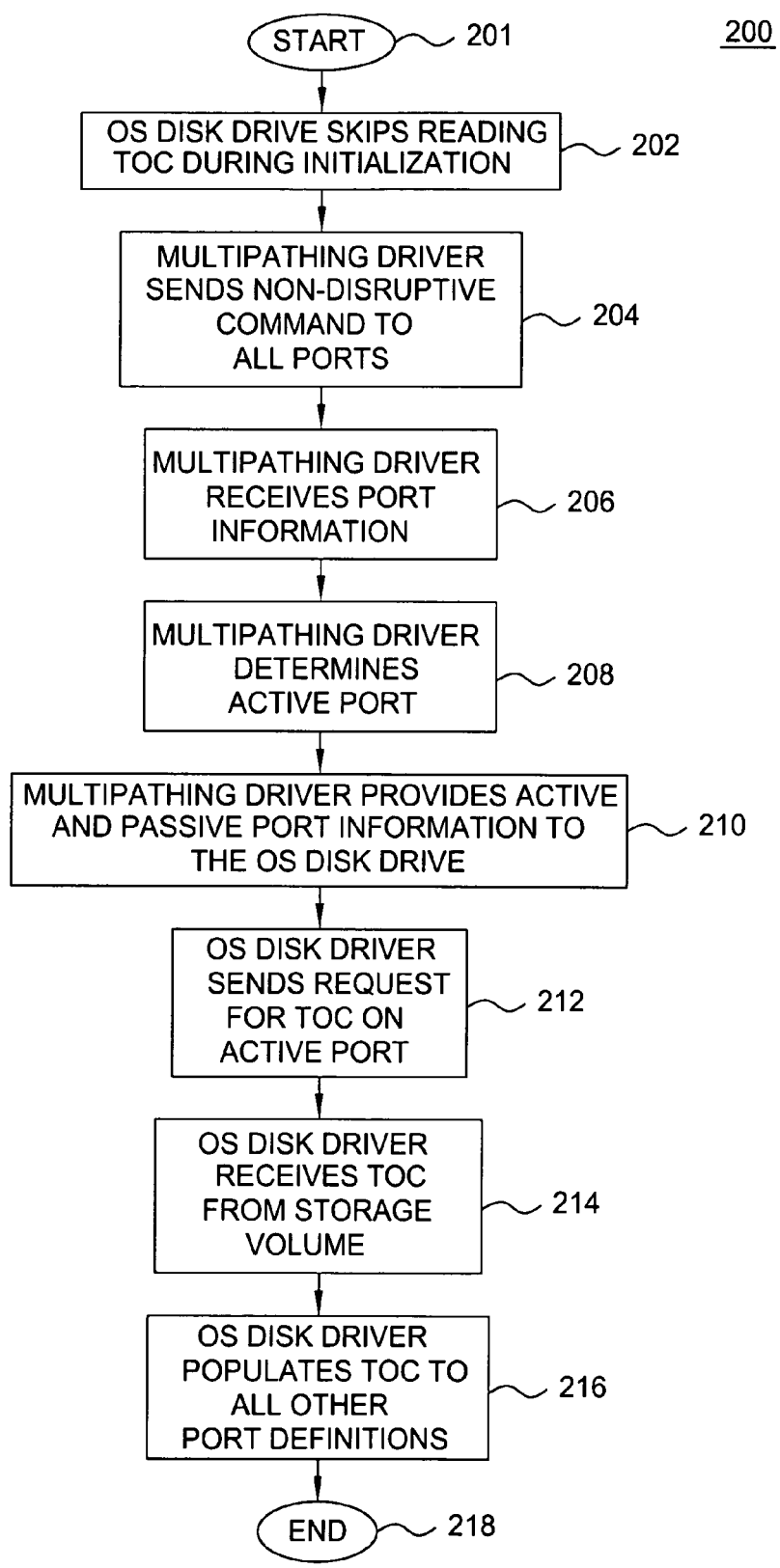
FIG. 2 depicts a flow diagram of a method for providing a multipathing connection to a storage volume in accordance with the present invention.

FIG. 2 depicts a flow diagram of a method 200 of operation of the disk drivers 110 and 128. The method 200 commences at step 201 and proceeds to step 202 where the OS disk driver 110 forgoes the reading of the disk array's TOC during its initialization process. The method 200 then proceeds to step 204, where the multipathing disk driver 128 transmits a non-disruptive, non-READ/WRITE command to a plurality ports in the storage volume 104. This non-disruptive, non-READ/WRITE command is typically an inquiry or mode sense command sent to obtain port information from the storage volume 104 during the initialization process. The non-READ/WRITE command is then sent to all ports of the storage volume 104. Such a non-READ/WRITE command does not require the storage volume 104 to retrieve information from a disk drive array 126 (i.e., the information is available from the port definitions 130A and 130B stored in the memories 124A and 124B). As such, failover from the active storage processor 122A to the passive storage processor 122B is not invoked. After receiving the request from the multipathing disk driver 128, the storage volume 104 sends back port information regarding the storage volume 104 through each port that received a request. The method 200 proceeds to step 206 where the multipathing disk driver 128 receives the requested port information from the various ports. At step 208, the multipathing disk driver 128 derives the multipathing information that includes the number of paths available to the storage volume 104 and the type of path. Based on this port information, the active port and its respective storage processor 122A can be determined and distinguished from any passive port. At step 210, the multipathing disk driver 128 provides the recently acquired active and passive port information to the OS disk driver 110. The method 200 continues to step 212, where the OS disk driver 110 sends a request to the active storage processor 122A for the storage volume's storage parameter information 106 (e.g. table of contents from the disk drive array within the storage volume). In response to this command, the storage volume 104 transmits the appropriate table of contents (TOC) information 106 to the host 102A. At step 214, the TOC information 106 is received by the OS disk driver 110. The method 200 then proceeds to step 216 where the TOC information 120A is copied and subsequently distributed as TOC information 120B to all the other remaining port definitions 112 within the host computer 102A by the OS disk driver 110. The duplication of the TOC information 120 to the port definitions 112B associated with the passive ports eliminates the disk driver's need to read the storage parameter information (i.e. table of contents data) in the storage volume 104 using the passive storage processor 122B. As such, failover is prevented. Lastly, the method 200 terminates at step 218.

By use of the foregoing method, any host 102 in the network may be initialized and access the storage volume 104 without causing a READ command to be inadvertently sent to the passive storage processor 122B. Such control avoids unnecessary failovers to occur. Once the port definitions are established, the network operates in a conventional manner.

Note that the foregoing description depicted a storage volume with two storage processors and a single disk array. Those skilled in the art will realize the invention is useful with a storage volume with more than two storage processors and/or more than one disk array.

While the foregoing is directed to embodiments of the present invention, other and further embodiments of the invention may be devised without departing from the basic scope thereof, and the scope thereof is determined by the claims that follow.

What is claimed is:

1. A method in a computer system, comprising:
    initializing a disk driver, wherein
        the computer system is a host computer comprising the disk driver,
        the disk driver is configured to facilitate communications between the host computer and a storage volume,
        the host computer is configured to communicate with the storage volume using the disk driver such that the initializing is performed without requesting, during the initializing, storage parameter information from the storage volume, and
        the initializing comprises
            sending a non-READ/WRITE command to a plurality of ports of
                the storage volume, wherein
                    the storage volume comprises a storage device configured to be coupled to the plurality of ports, and
                    the non-READ/WRITE command requests port information from a location other than the storage device,
            receiving the port information from one or more of the plurality of ports of the storage volume, in response to the non-READ/WRITE command,
            identifying an active port and a passive port, using the port information, wherein
                the plurality of ports comprises the active port and the passive port,
            sending a request to the storage device for the storage parameter information, wherein
                the request is sent using the active port,
            receiving the storage parameter information, and
            copying the storage parameter information to a port definition for the passive port.

2. The method of claim 1, wherein
the plurality of ports comprises two ports.

3. The method of claim 1, wherein
the storage parameter information comprises a table of contents of the storage device.

4. The method of claim 1, wherein
the non-READ/WRITE command comprises an inquiry command 5. The method of claim 1, wherein
the non-READ/WRITE command comprises a mode sense command.

6. A computer system comprising:
    a storage volume; and
    a host computer, wherein
        the host computer comprises a plurality of disk drivers,
        the plurality of disk drivers is configured to facilitate communications between the host computer and a storage volume,
        the host computer is configured to perform initialization of the plurality of disk drivers, and
        the plurality of disk drivers comprises
            a first disk driver, wherein
                as part of the initialization, the first disk driver is configured to
                    send a non-READ/WRITE command to a plurality of ports of
                        the storage volume, wherein
                            the storage volume comprises a storage device configured to be coupled to the plurality of ports, and
                            the non-READ/WRITE command requests port information from a location other than the storage device,
                    receive the port information from one or more of the plurality of ports of the storage volume, in response to the non-READ/WRITE command, and
                    identify at least one active port and at least one passive port of the plurality of ports of the storage volume, using the port information; and
            a second disk driver, wherein
                as part of the initialization, the second disk driver is configured to
                    send a request to the storage device for the storage parameter information, wherein
                        the request is sent, using the at least one active port, after the at least one port is identified by the first disk driver and after commencement of the initialization,
                    receive the storage parameter information, and
                    copy the storage parameter information to a port definition for the at least one passive port.

7. The apparatus of claim 6, wherein the first and second disk drivers comprise two portions of a single disk driver.

8. The apparatus of claim 6, wherein the first disk driver comprises a multipathing disk driver.

9. The apparatus of claim 6, wherein the second disk driver comprises an operating system disk driver.

10. A non-transitory computer-readable storage medium storing program instructions executable by a processor of a computer system to:
    initialize a disk driver, wherein
        the computer system is a host computer comprising the disk driver,
        the disk driver is configured to facilitate communications between the host computer and a storage volume,
        the program instructions, upon execution by the host computer, are configured to cause the host computer perform initialization of the disk driver without requesting, during the initialization, storage parameter information from the storage volume, and the host computer is configured to perform the initialization by virtue of being configured to
- send a non-READ/WRITE command to a plurality of ports of the storage volume, wherein
  - the storage volume comprises a storage device configured to be coupled to the plurality of ports, and
  - the non-READ/WRITE command requests port information from a location other than the storage device,
- receive the port information from one or more of the plurality of ports of the storage volume, in response to the non-READ/WRITE command,
- identify at least one active port and at least one passive port of the plurality of ports of the storage volume,
- send a request to the storage device for storage parameter information, wherein the request is sent using the at least one active port, using the port information,
- receive the storage parameter information, and copy the storage parameter information to a port definition for the at least one passive port.

11. The non-transitory-computer readable storage medium of claim 10, wherein the storage parameter information comprises a table of contents of the storage device.

12. The non-transitory-computer readable storage medium of claim 10, wherein the non-READ/WRITE command comprises an inquiry command.

13. The non-transitory computer-readable storage medium of claim 10, wherein the non-READ/WRITE command comprises a mode sense command.

14. The method of claim 1, wherein the active port is configured to accept READ/WRITE commands, and receipt of a READ/WRITE command via the passive port invokes a failover.

\* \* \* \* \*

UNITED STATES PATENT AND TRADEMARK OFFICE
CERTIFICATE OF CORRECTION

PATENT NO. : 8,984,175 B1
APPLICATION NO. : 10/832150
DATED : March 17, 2015
INVENTOR(S) : Shiv Rajpal, Ajay Salpekar and Margaret Kwong Page 1 of 1

It is certified that error appears in the above-identified patent and that said Letters Patent is hereby corrected as shown below:

In the Claims:

Column 6
Line 6, in Claim 4, insert a -- . -- immediately after "command"
Line 41, in Claim 6, replace: "for the storage" by -- for storage --
Line 50, in Claim 7, replace: "apparatus" by -- computer system --
Line 52, in Claim 8, replace: "apparatus" by -- computer system --
Line 54, in Claim 9, replace: "apparatus" by -- computer system --

Column 8
Line 3, in Claim 11, replace: "non-transitory-computer readable" by -- non-transitory computer-readable --
Line 8, in Claim 12, replace: "non-transitory-computer readable" by -- non-transitory computer-readable --

Signed and Sealed this
Twenty-fourth Day of May, 2016

Michelle K. Lee
*Director of the United States Patent and Trademark Office*